INVENTOR.
THEODORE HUBKA

United States Patent Office 3,095,561
Patented June 25, 1963

3,095,561
MICROWAVE TRANSMITTER AND RECEIVER
Theodore Hubka, Briarcliff Manor, N.Y., assignor to General Precision, Inc., a corporation of Delaware
Filed Sept. 12, 1961, Ser. No. 137,551
7 Claims. (Cl. 343—5)

This invention relates to microwave transmitters and more specifically to a simple Doppler transmitter-receiver used in a Doppler radar navigation system.

One conventional Doppler navigation system for use on aircraft employs a pulsed microwave generator energizing an antenna through a duplexing device. A second generator, termed a local oscillator, generates a frequency separated from the microwave generator frequency by, for example, 20 mc.p.s., termed the intermediate frequency. The local oscillator frequency is used to demodulate the received signal containing Doppler information, resulting in a carrier at the intermediate frequency.

The present invention accomplishes a similar result but with the use of only one microwave generator or oscillator which may consist of a magnetron or any other microwave generating element that can be "pulled," or changed in output frequency by a change in its loading. In applying such a generator to this invention, the generator output is connected to a double-throw microwave switch, or equivalent, operated by a pulse repetition frequency generator. One of the switch outputs is applied through a duplexing circuit to a transmitter-receiver antenna and the second of the switch outputs is connected through an impedance to ground. A mixer is connected to the receiver terminal of the duplexing circuit and a heterodyning signal is also applied to the mixer. This heterodyning signal is taken from the second switch output or, in some cases, may consist merely of leakage from the transmitting microwave generator without any explicit connection. The mixer output is applied to the intermediate frequency amplifier.

The operation of this system depends on pulling the microwave generator by making the load imposed on it by the grounded impedance different from the load imposed on it by the duplexing circuit. This load difference can cause a difference in frequency of a microwave generator, operating in the S, X or K band, of several mc.p.s. It is important in the operation of this system that the echo or the reflected microwave signal carrying Doppler information returns to the system after a time lapse, so that the transmitted signal at one generator frequency returns to the system at a later time, when the generator has shifted to another frequency. These two signals at different frequencies are simultaneously imposed on the mixer, resulting in a carrier signal having a frequency equal to the difference of the two generator frequencies. This carrier signal carries the Doppler information as modulation, and is amplified in a wideband intermediate frequency amplifier.

The principal object of this invention is to provide a simplified Doppler microwave transmitter-receiver which does not require a separate local oscillator.

Another object of this invention is to provide a simplified Doppler microwave transmitter-receiver containing a signal generator which acts both as a transmitting generator and as a local oscillator.

Another object of this invention is to provide a transmitter-receiver containing a transmitter emitting a signal frequency which is changed by changing the load, one frequency being employed to transmit and the other frequency being employed to heterodyne demodulate the received signal.

A further understanding of this invention may be secured from the detailed description and the drawings, in which.

Figure 1:
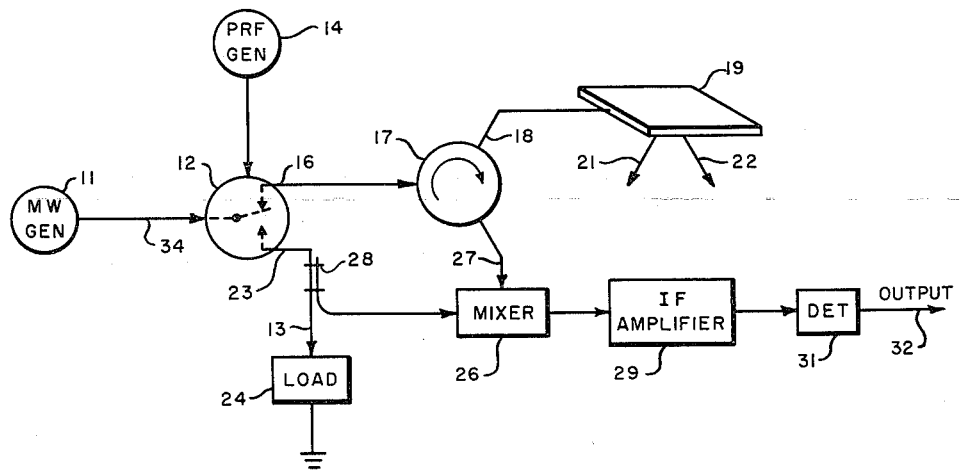
FIGURE 1 is a schematic drawing of an embodiment of the invention.

Referring now to FIGURE 1, a microwave generator 11 may be of any type which may be "pulled," that is, have its output frequency changed by changing the impedance of the load into which it operates. Magnetrons generally behave in this way. A specific example of a magnetron suitable for use in this invention is type L–3089, made by the Electron Tube Division of Litton Industries, Inc., San Carlos, California. The output of generator 11 is applied to an electronic single-pole double-throw switch, 12. Such a switch is described in an article entitled, Microwave Switching With Computer Diodes, by M. Bloom, in the January 15, 1960 issue of the magazine Electronics, on pages 85–87.

A pulse repetition frequency generator 14 preferably consists of a multivibrator oscillator capable of operating at any frequency between 150 kc.p.s. and 500 kc.p.s and emitting a rectangular waveform. This generator 14 is connected to operate the switch 12.

The electronic switch 12 has its microwave output terminal 16 connected to one terminal of a microwave circulator 17. This circulator may consist, for example, of a coupling device such as described in U.S. Patent No. 2,719,274 issued September 27, 1955. It is here used as a duplexing device. The duplex terminal 18 is connected to a microwave antenna 19 suitable for use in "Janus" operation. That is, the antenna emits two beams simultaneously, indicated by the arrows 21 and 22. The antenna is oriented to point along the ground track of the aircraft, so that one beam points generally ahead of the aircraft and the other beam points generally toward the rear. Such an antenna is described in U.S. Patent No. 2,915,748 issued December 1, 1959.

The electronic output terminal 23 of the switch 12 is connected through conductor 13 and an impedor 24 to ground. The impedance of the impedor 24 may consist entirely of microwave resistance or of microwave reactance, but generally it will consist of a combination of resistance and reactance. In any case the load on the microwave generator 11 presented by the dummy load impedance 24 must be different from the load presented to the generator by the duplexer 17. A Rieke diagram may be used to compute the effects of loads of various amounts and phase angles on the generator in a manner well understood by those skilled in the art. The impedances presented to the generator are so designed that the generator frequency is "pulled" or changed, upon operation of the switches, by a selected amount, which becomes the intermediate carrier frequency.

A mixer 26 receives one input through conductor 27 from the duplexer 17 and receives its heterodyning input from a directional coupler 28, connected to the waveguide 13 connecting the switch terminal 23 to the impedor 24. This coupler 28 attenuates the signal by a suitable amount. Alternatively, in some cases enough signal will leak through the air and through the switch 12 and duplexer 17 to perform the heterodyning function in the mixer 26, in which case the input from the directional coupler 28 will be unnecessary and can be omitted.

The mixer 26 output is applied to a broadband intermediate frequency amplifier 29. Its output is demodulated in a detector 31 to secure a signal representing the Doppler spectrum in conductor 32. The central frequency of the spectrum is a function of aircraft speed and, by means which are no part of this invention, can be converted to a signal indicating aircraft ground speed.

Figure 2:
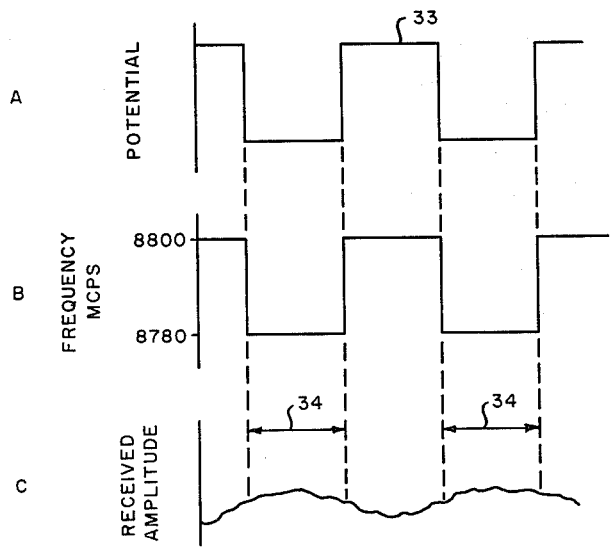
FIGURE 2 depicts graphs illustrating the operation of the invention.

In the operation of this circuit it is preferred to employ a 50% transmitting duty cycle in order to secure maximum transmitting beam power. The PRF generator 14 should therefore have equal-duration positive and negative half cycles, as indicated in FIGURE 2A. Let it be assumed that during the half cycles 33 the switch 12 makes a low impedance connection between its input terminal 34 and output terminal 16, while during the remaining half cycles the switch makes a low-impedance connection between terminals 34 and 23. Also let it be supposed that the resistance and phase angle of the impedor 24 are such, relative to the input impedance of the duplexer 17, that when the impedor 24 loads the microwave generator its frequency is less by 20 mc.p.s. than when the duplexer 17 loads the generator. Thus, if the generator transmits at 8800 mc.p.s. through the duplexer 17, its frequency when connected to the load 24 will be less by 20 mc.p.s., or will be 8780 mc.p.s. These changes in frequency are shown in graph B, FIGURE 2.

If the pulse repetition period is 5 microseconds, each half cycle in FIGURE 2 has a duration of 2½ microseconds. If, then the received microwave pulse is delayed 2½ microseconds after the transmitted pulse, the Doppler spectrum will be received during the time when the microwave generator 11 is connected to the load 24. The received signal may be as indicated in graph C, and it will contain two frequencies, one, 8800 mc.p.s. plus D, the Doppler frequency, and the other 8800 mc.p.s. minus D. These frequencies are mixed and heterodyned in the mixer or heterodyne detector 26 with the signal of frequency 8780 mc.p.s. emitted during the time periods 34 by the generator 11. The result will be a signal having two difference frequencies, 20 mc.p.s. plus and minus D. This signal is applied to the intermediate frequency amplifier 29. This amplifier has a transmission band centered at 20 mc.p.s., and in order to accept a carrier which may vary because it is not tightly frequency controlled, has a bandwidth of 10 mc.p.s. The output, demodulated by detector 31, produces a difference signal having a spectrum of frequency equal to twice the Doppler spectrum frequency. This frequency of this signal, in conductor 32, represents the aircraft ground speed, and may be processed to indicate speed by means which are not part of this invention.

What is claimed is:

1. A microwave transmitter-receiver comprising, a microwave generator, double-throw switch means, oscillator means for operating said double-throw switch means, a transmitter-receiver element energized by said generator through said switch means in one position of operation thereof, load means energized by said generator through said switch means in the other position of operation thereof, and a receiver element excited from said transmitter-receiver element and also by said generator through said switch means in said other position of operation.

2. A microwave transmitter-receiver comprising, a microwave whose frequency is a function of the load impedance imposed thereon, two-position switch means, oscillator means for operating said switch means, a transmitter-receiver element energized by said generator through said switch means in one of the two positions thereof, said transmitter-receiver element presenting a first selected load impedance to the generator, load means energized by said generator through said switch means in the other of said two positions thereof, said load means presenting a second selected load impedance to the generator, a mixer, means exciting said mixer by the output of said transmitter-receiver element, means exciting said mixer by said generator through said switch means in said other of said two switch positions, and means utilizing the modulated output of said mixer means.

3. A microwave transmitter-receiver comprising, a microwave generator capable of generating signals having first and second frequences under different load impedances, two-position switch means, oscillator means for operating said switch means, a transmitter-receiver element energized by said generator at said first frequency through said switch means in one of said two positions, load means having an impedance different from that of said transmitter-receiver element, said load means being energized by said generator at said second frequency through said switch means in the other of said two positions, mixer means, means exciting said mixer means from said transmitter-receiver element, and means exciting said mixer means from said generator at said second frequency.

4. A microwave transmitter-receiver comprising, a microwave generator capable of generating signals having first and second frequencies under different load impedances, a two-position switch, an oscillator for operating said switch, a duplexer energized by said generator at said first frequency through said switch in one of said two positions, a load having an impedance differing from the input impedance of said duplexer, means energizing said load by said generator at said second frequency through said switch in the other of said two positions, a mixer, means connecting said duplexer to excite said mixer, and means exciting said mixer at said second generator frequency.

5. A microwave transmitter-receiver comprising, a microwave generator having a first output frequency at a first load impedance and a second output frequency at a second load impedance, a two-position switch having its input connected to said microwave generator and having two output terminals, an oscillator for operating said switch, a duplexer having input, duplex and output terminals, means connecting said duplexer input terminal to one switch output terminal, said duplexer presenting said first load impedance to said generator when the switch is in one position whereby the generator generates signals at said first frequency, a dummy load connected to the other switch output terminal, said dummy load presenting said second load impedance to said generator when the switch is in the other position whereby the generator generates signals at said second frequency, a mixer, means connecting said duplexer output terminal to said mixer, means exciting said mixer at said second output frequency emitted by said generator during the time when said switch is in its other position, and means utilizing said mixer output.

6. A microwave transmitter-receiver comprising, a microwave generator, means for cyclically changing said microwave generator frequency from a first to a second value and for alternately providing first and second outputs at said first and second frequencies, respectively, an antenna for directing microwave energy toward a target and for receiving microwave energy reflected from said target, a duplexer responsive to said first output for connecting the microwave energy at the said first frequency value to the said antenna and for connecting the reflected energy received by the antenna to a receiving circuit, and means for connecting the said second output to the receiving circuit.

7. A microwave transmitter-receiver as set forth in claim 6 in which the receiving circuit includes a mixer which provides sum and difference frequency products of the energy received from the said duplexer and the said second output.

References Cited in the file of this patent

UNITED STATES PATENTS 2,452,566    Hansen _____ Nov. 2, 1948